(12) United States Patent
Johnson

(10) Patent No.: US 11,767,116 B2
(45) Date of Patent: Sep. 26, 2023

(54) METHOD AND APPARATUS FOR DETECTING SEATBELT COMPLIANCE IN COMMERCIAL PASSENGER AIRCRAFT

(71) Applicant: Jeff Johnson, San Francisco, CA (US)

(72) Inventor: Jeff Johnson, San Francisco, CA (US)

( * ) Notice: Subject to any disclaimer, the term of this patent is extended or adjusted under 35 U.S.C. 154(b) by 0 days.

(21) Appl. No.: 17/963,185

(22) Filed: Oct. 10, 2022

(65) Prior Publication Data

US 2023/0042704 A1 Feb. 9, 2023

Related U.S. Application Data

(63) Continuation of application No. 16/895,605, filed on Jun. 8, 2020, now Pat. No. 11,465,746.

(60) Provisional application No. 62/977,577, filed on Feb. 17, 2020.

(51) Int. Cl.
*B64D 11/00* (2006.01)
*B60R 22/48* (2006.01)
*B60R 21/015* (2006.01)
*B64D 11/06* (2006.01)

(52) U.S. Cl.
CPC .... *B64D 11/0015* (2013.01); *B60R 21/01544* (2014.10); *B60R 22/48* (2013.01); *B64D 11/062* (2014.12)

(58) Field of Classification Search
None
See application file for complete search history.

(56) References Cited

U.S. PATENT DOCUMENTS

| 4,667,336 | A | | 5/1987 | Best |
| 4,885,566 | A | | 12/1989 | Aoki et al. |
| 5,311,302 | A | | 5/1994 | Berry et al. |
| 5,520,263 | A | | 5/1996 | Suran et al. |
| 5,555,458 | A | | 9/1996 | Large |
| 5,877,707 | A | * | 3/1999 | Kowalick ............... B60R 22/48 340/439 |
| 6,204,757 | B1 | | 3/2001 | Evans et al. |
| 6,215,395 | B1 | | 4/2001 | Slaughter et al. |
| 6,336,371 | B1 | | 1/2002 | O'Boyle |
| 6,362,734 | B1 | | 3/2002 | McQuade et al. |

(Continued)

FOREIGN PATENT DOCUMENTS

| CN | 103010152 | 9/2012 |
| FR | 2865174 | 1/2005 |
| KR | 10-2011-0043478 | 4/2011 |

OTHER PUBLICATIONS

Meder Electronic, "Seat Belt Reed Sensor"; product datasheet, https://standexelectronics.com/wp-content/uploads/Seat_Belt_Reed_Sensor.pdf.

(Continued)

*Primary Examiner* — Fekadeselassie Girma
(74) *Attorney, Agent, or Firm* — Steven J Shattil

(57) ABSTRACT

A seatbelt detection system detects seatbelt use in each seat of a passenger aircraft to produce safety-compliance data. A computer system, which is communicatively coupled to the seatbelt detection system, receives sensor data from a plurality of sensors in an aircraft cabin; and employ an artificial intelligence (AI) program to train on input data comprising at least one of safety compliance data, aircraft system data, cabin environment data, cabin operations data, or aircraft operations data; and the AI program is configured to minimize a summed error of predictions of seatbelt compliance.

20 Claims, 4 Drawing Sheets

(56) References Cited

U.S. PATENT DOCUMENTS

| | | | |
|---|---|---|---|
| 6,405,607 B2 | 6/2002 | Faigle et al. | |
| 6,448,907 B1 * | 9/2002 | Naclerio | B64D 45/0059 |
| | | | 280/801.1 |
| 6,450,534 B1 | 9/2002 | Blakesley et al. | |
| 6,888,475 B2 | 5/2005 | Darr | |
| 7,126,497 B2 | 10/2006 | Face et al. | |
| 7,145,448 B2 | 12/2006 | Tanaka et al. | |
| 7,265,671 B1 | 9/2007 | Valles et al. | |
| 7,383,911 B2 | 6/2008 | Schondorf et al. | |
| 7,446,652 B2 | 11/2008 | Hagenbuch | |
| 7,511,610 B2 | 3/2009 | Downey et al. | |
| 7,813,856 B2 | 10/2010 | McCall et al. | |
| 7,916,008 B2 | 3/2011 | Nathan et al. | |
| 8,005,595 B2 | 8/2011 | Marriott et al. | |
| 8,289,145 B2 | 10/2012 | Miller et al. | |
| 8,806,543 B1 | 8/2014 | Curtis et al. | |
| 9,908,625 B2 * | 3/2018 | Goyal | B60R 22/48 |
| 10,005,563 B2 * | 6/2018 | Pollard | B64D 11/062 |
| 10,035,492 B2 * | 7/2018 | Lee | B60R 22/48 |
| 10,464,678 B2 * | 11/2019 | Brunaux | B64D 11/062 |
| 10,586,444 B2 | 3/2020 | Leary et al. | |
| 10,691,955 B1 * | 6/2020 | Correia Gracio | H04N 23/57 |
| 11,518,517 B2 * | 12/2022 | Bates | G06Q 20/123 |
| 2003/0160497 A1 * | 8/2003 | Darr | B64D 45/0044 |
| | | | 297/468 |
| 2004/0124974 A1 | 7/2004 | Ota et al. | |
| 2005/0038586 A1 | 2/2005 | Griffin et al. | |
| 2005/0080533 A1 | 4/2005 | Basir et al. | |
| 2006/0017564 A1 | 1/2006 | Phillips | |
| 2006/0071769 A1 | 4/2006 | Ide et al. | |
| 2007/0085669 A1 | 4/2007 | Becker et al. | |
| 2007/0205884 A1 | 9/2007 | Federspiel et al. | |
| 2007/0285219 A1 | 12/2007 | Greene | |
| 2008/0297341 A1 | 12/2008 | McClanahan | |
| 2009/0096624 A1 | 4/2009 | Stengel et al. | |
| 2009/0112407 A1 | 4/2009 | Kneller et al. | |
| 2009/0177357 A1 * | 7/2009 | Long | B60R 22/48 |
| | | | 701/45 |
| 2011/0090079 A1 | 4/2011 | Morino et al. | |
| 2012/0026331 A1 | 2/2012 | Winner et al. | |
| 2013/0214919 A1 | 8/2013 | Bassali | |
| 2014/0214279 A1 | 7/2014 | Bunton | |
| 2017/0283086 A1 * | 10/2017 | Garing | B64D 45/0051 |
| 2018/0247547 A1 * | 8/2018 | Karunakar | G08G 5/0091 |
| 2019/0112050 A1 * | 4/2019 | Ibrahim | G06F 9/453 |
| 2019/0177004 A1 * | 6/2019 | Skelly | B64D 45/0056 |
| 2019/0197748 A1 * | 6/2019 | Vandewall | G06T 11/60 |
| 2019/0258263 A1 * | 8/2019 | Wendel | B60R 21/01538 |
| 2019/0308744 A1 * | 10/2019 | Riedel | B64D 11/04 |
| 2019/0370575 A1 * | 12/2019 | Nandakumar | G05D 1/0088 |
| 2020/0047888 A1 * | 2/2020 | Sivignon | B64D 11/04 |
| 2020/0070772 A1 * | 3/2020 | Kim | B64D 45/00 |
| 2020/0231109 A1 * | 7/2020 | Baltaxe | G06N 3/08 |
| 2020/0340274 A1 * | 10/2020 | Di Carlo | B64D 11/003 |
| 2023/0042704 A1 * | 2/2023 | Johnson | B60R 21/01544 |

OTHER PUBLICATIONS

H. Baskas, "New way to see if seat belts are fastened"; Stuck at the airport, https://stuckattheairport.com/2013/10/02/new-way-to-see-if-seat-belts-are-fastened/ Oct. 2, 2013.

PIHER Sensing Systems, "Seat belt sensor" product datasheet, https://www.piher.net/pdf/SeatBeltSensor.pdf.

* cited by examiner

Central monitor displaying seatbelt compliance

Fasten seatbelt sign: ON

Seatbelt Usage:

Row  1 2 3 4 5 6 7 8 9 10 11 12 13 14 15 16 17 18
 A   ⊙×⊙⊙⊙⊙⊙⊙⊙⊙⊙⊙⊙×⊙⊙⊙⊙
 B   ⊙⊙⊙⊙⊙⊙⊙⊙⊙⊙⊙⊙⊙⊙⊙⊙⊙⊙
 C   ⊙⊙⊙×⊙⊙⊙⊙⊙⊙⊙⊙⊙⊙⊙⊙⊙⊙
 D   ⊙⊙⊙⊙⊙⊙⊙⊙⊙⊙⊙⊙⊙⊙⊙⊙⊙⊙
 E   ⊙⊙×⊙⊙⊙⊙⊙⊙⊙⊙⊙⊙⊙×⊙⊙⊙
 F   ⊙⊙⊙⊙⊙⊙⊙⊙⊙⊙⊙⊙×⊙⊙⊙⊙⊙

Row 19 20 21 22 23 24 25 26 27 28 29 30 31 32 33
 A   ⊙ ⊙ ⊙ ⊙ ⊙ ⊙ × ⊙ ⊙ ⊙ ⊙ ⊙ ⊙ ⊙ ⊙
 B   ⊙ ⊙ ⊙ ⊙ ⊙ ⊙ ⊙ ⊙ ⊙ ⊙ ⊙ × ⊙ ⊙ ⊙
 C   ⊙ ⊙ ⊙ ⊙ ⊙ ⊙ ⊙ ⊙ ⊙ ⊙ ⊙ ⊙ ⊙ ⊙ ⊙
 D   ⊙ ⊙ ⊙ ⊙ ⊙ ⊙ ⊙ ⊙ ⊙ ⊙ ⊙ ⊙ ⊙ ⊙ ⊙
 E   ⊙ ⊙ × ⊙ ⊙ ⊙ ⊙ ⊙ ⊙ ⊙ ⊙ ⊙ ⊙ ⊙ ⊙
 F   ⊙ ⊙ ⊙ ⊙ ⊙ ⊙ ⊙ ⊙ ⊙ ⊙ ⊙ ⊙ ⊙ ⊙ ⊙

FIG. 3A

Alternative central monitor displaying seatbelt non-compliance

Fasten seatbelt sign: ON

Seatbelts Not Fastened:
  2A, 14C, 18E, 34D

FIG. 3B

METHOD AND APPARATUS FOR DETECTING SEATBELT COMPLIANCE IN COMMERCIAL PASSENGER AIRCRAFT

CROSS REFERENCE TO PRIOR APPLICATIONS

This application is a Continuation of U.S. patent application Ser. No. 16/895,605, filed on Jun. 8, 2020, now U.S. Pat. No. 11,465,746; which claims the priority benefit of U.S. Patent Application Ser. No. 62/977,577, filed on Feb. 17, 2020, each of which is expressly incorporated by reference in its entirety.

BACKGROUND

1. Field

The following relates to methods, systems, and devices for monitoring airplane passenger compliance with safety instructions.

2. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

On commercial airliners, passengers are often asked to fasten their seatbelts as a safety measure. To check if seatbelts are fastened, flight attendants walk through the cabin, looking at each passenger's lap to check if their seatbelt is fastened. On long flights, passengers cover themselves with blankets, making it difficult for flight attendants to ascertain seatbelt compliance. Often, passengers are asked to fasten their seatbelt over the blanket so the flight attendants can check if the belt is fastened, which is uncomfortable, so many passengers do not comply.

The need for flight attendants to walk through the cabin to check each occupied seat for seatbelt compliance is time-consuming and can annoy passengers, especially when passengers are sleeping. As airlines strive to provide the best flight experience to their customers and ensure their safety in flight and during taxi, there is a need for automated seatbelt compliance monitoring.

SUMMARY

The described techniques relate to improved methods, systems, devices, or apparatus that support providing for monitoring and/or analyzing passenger safety compliance, including seatbelt compliance, onboard a commercial aircraft.

In some aspects, a seatbelt monitoring system in an aircraft detects passenger seatbelt compliance and may include occupancy detection sensors. To prevent passengers from defeating seatbelt monitoring by simply fastening the seatbelt behind them on the seat, the detection system may be configured to determine whether the belt is both extended and fastened. The system may be connected to a local area network (e.g., a wireless local area network) that conveys sensor information (e.g., seatbelt use and/or seat occupancy) to a computer system, such as a central processor, a server, or a mobile computing device. In some aspects, software applications can process the sensor information, such as to produce a real-time user display of the information and/or generate reports based on the data. An exemplary report may include a time-based record of when during the flight each passenger did or did not have their seatbelt fastened. This record may include one or more data structures, such as a table of sensor information paired with or indexed by timestamps. The time-based record may indicate each passenger's compliance with the fasten-seatbelt sign and/or other events, which may be timestamped.

In one aspect, the processor is a central processor or server built into the airplane, executing software that displays the current seatbelt usage by each occupied seat. The computer system may generate a time-based record of seatbelt usage by each passenger, and may include other information, such as information from aircraft operations, cabin operations, cabin environment, flight-crew inputs, and/or other sensor data. In one example, the record may include (and may be indexed by) the status of the fasten-seatbelt sign. The processor might adapt cabin operations and/or operations policy based on analysis of the time-based record, possibly in relationship to the other information.

In one aspect, the processor comprises a user interface (e.g., a graphical user interface) for displaying data, reports, and/or interacting with the system, and the user interface may be located in the flight crew service area of the aircraft. In another aspect, the user interface is provisioned via a wireless network interface to a mobile computing device, such as a tablet, smartphone, wearable device, or some other user device employed by flight attendants. An exemplary user interface may display a map of the cabin, showing all seats and highlighting or otherwise marking seats according to which certain data values are received (e.g., unlatched seatbelt, seat occupancy status, seatback incline, tray table position). In another aspect, the user interface provides a text-based indication of seat numbers corresponding to particular data values (e.g., unlatched seatbelt, seat occupancy status, seatback incline, tray table position).

In some aspects of the disclosure, a seatbelt, when fastened or unfastened, completes an electrical circuit or otherwise activates electronic detection circuitry that causes an indicator light in close proximity to the seat to be illuminated, wherein the light is visible to flight crew (such as alongside the aisle or above the seat). The fastened/unfastened status of seatbelts in each seat can be indicated by lights on the aircraft wall or ceiling above each seat-row, on or near the overhead bins, on the aisle side of each aisle seat, or on the floor next to the seat-row. This can allow the flight crew to see which seats are out of compliance by looking down the length of the passenger compartment. Similar detection circuitry may detect and convey other compliance statuses, such as seatback incline and/or tray table position. In some aspects, an artificial intelligence (AI) program coupled to a cabin imaging (such as radar, infrared, optical, or acoustic) system may be configured to detect any combination of seatback incline, tray table position, and seat occupancy. In some aspects, the detection circuitry can be configured to send a message to each passenger who is not in compliance with seatbelt, seatback, and/or tray table instructions. For example, each passenger seat may have an inflight-entertainment (IFE) system with a media display configured to display such messages. An IFE may be oriented in a seatback or armrest console, for example. The messages may be any combination of graphical or audio messages.

In some aspects, the detection circuitry may communicate seatbelt status (i.e., the seatbelt is fastened or unfastened) to a display and/or a computer processor via a communication network, such as a wireless network. The display may be a display of a mobile computing device, such as a tablet or smartphone. In some aspects, a seatbelt, when fastened or unfastened, causes an electronic sensor to generate a sensor signal, which is communicated to the detection circuitry. The electronic sensor can function as a seatbelt compliance sensor that detects at least one seatbelt status, and may detect seat occupancy (i.e., if the seat is occupied or unoccupied). The detection circuitry, upon receiving a predetermined combination of inputs from one or more sensors, and possibly external inputs, can communicate a seatbelt status message to a user interface (e.g., a display) and/or computer processor. The external inputs can include a signal from an illuminated seatbelt sign, or a chime that is sounded to convey messages amongst the flight crew. In some aspects, the detection circuitry and/or computer processor may communicate a warning or safety compliance message to an individual passenger via the passenger's IFE system, and the message may be personalized for the passenger based on a-priori passenger information and/or sensor readings that indicate the passenger's activity.

In some aspects, the seatbelt-compliance sensor may comprise one or more sensors to detect the presence or activity of a passenger. Passenger activity may be detected and recorded, possibly in combination with other information, to monitor or predict passenger comfort levels, and possibly to predict safety compliance. Such information may be useful for adjusting environmental controls inside the cabin and/or adapting cabin operations.

In some aspects of the disclosure, seatbelt compliance sensors are communicatively coupled via a wired or wireless network to a display terminal. In some aspects, the network is coupled to a computer processor that can store and analyze seatbelt compliance data received from the seatbelt compliance sensors. In aspects wherein the seatbelt compliance sensors each comprise a wireless transmitter communicatively coupled to the wireless network, each transmitter can uniquely identify its associated transmission, such as by assigning a unique identifier to the wireless signal, such as a unique frequency, multiple access code, or some other signaling. The computer processor may comprise computer-readable memory with software instructions stored thereon, that, when executed, cause the computer processor to compute seatbelt compliance statistics. The computer processor may receive input data from other aircraft systems, such as aircraft cabin status (e.g., fasten-seatbelt indicator, cabin temperature, cabin pressure, lavatory occupancy), flight status (e.g., taxi, takeoff, cruising altitude, holding pattern, final approach, landing, Center Airspace control, TRACON control, ramp tower control), and/or other sensors (e.g., turbulence detection).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

FIG. 3A and FIG. 3B illustrate exemplary user displays.

DETAILED DESCRIPTION

As required, detailed embodiments of the present application are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the teachings of the present application.

Figure 1A:
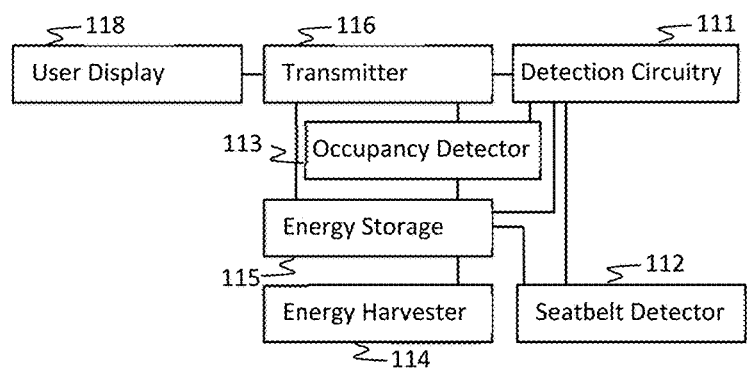
FIG. 1A depicts a seatbelt-compliance system that can be implemented in accordance with aspects of the disclosure.

FIG. 1A depicts a seatbelt-compliance system that can be implemented in accordance with aspects of the disclosure. Detection circuitry 111 is communicatively coupled to a seatbelt detector 112, an occupancy detector 113, and a transmitter 116. Optionally, a user display 118 may be communicatively coupled to the transmitter 116 or detection circuitry 111. Electrical energy can be supplied to one or more of the components 111, 112, 113, 116, or 118 by a power source, such as an energy storage unit 115 and/or energy harvester 114.

In some aspects, the seatbelt detector 112 detects if the seatbelt is in use, and optionally, if the seatbelt is being used properly. The seatbelt detector 112 can be configured to detect through electrical, mechanical, or electronic means if the seatbelt is extended and/or buckled.

In some aspects, the occupancy detector 113 comprises one or more sensors that detect if a passenger is sitting in the seat, such as by detecting weight, seat-back pressure, body heat, and/or any other indication of a passenger's presence. In some aspects, the occupancy detector 113 comprises a logic state in software or circuitry. In one aspect, the logic state may be an open or closed state of an electronic switch in the detector 113. In another aspect, the logic state may be a data value stored in memory, which the detection circuitry 111 reads. In some aspects, the logic state is instantiated by software that reads a flight manifest. The occupancy detector 113 may be responsive to a control signal received by the transmitter, which may set the logic state. The control signal may be transmitted automatically, such as via a software program running on an aircraft computer system, or the control signal may be transmitted in response to a user input to the aircraft computer system.

The detection circuitry 111 can comprise an electronic circuit or a computer processor that is programmed to perform the functions disclosed herein. The detection circuitry 111 can determine seatbelt compliance parameters, such as if the seat is occupied, and if the seatbelt is being (properly) used. Based on one or more combinations of seatbelt compliance parameters, the detection circuitry 111 instantiates a signal to the transmitter 116 and/or user display 118. In some aspects, the detection circuitry 111 transmits a data signal over a wireless network via the transmitter 116. In some aspects, the detection circuitry 111 activates or deactivates the user display 118, which may comprise one or more indicator lights near the seat or a display panel in another part of the aircraft. By way of example, the fastened/unfastened status of seatbelts in each seat may be indicated by lights on the aircraft wall or ceiling above each seat-row, on or near the overhead bins, on the aisle side of the aisle seat, or on the floor next to the seat row. In some aspects, indicator lights (or other user displays) 118 can include a wireless receiver communicatively coupled to the transmitter 116, and the communication link may employ any of various wireless technologies, such as Bluetooth (e.g., Bluetooth Smart), Long Range Wide Area Network (LoRaWAN), WiFi, or Zigbee. Various features disclosed herein can be employed separately or in combination to provide for a low-cost seatbelt-monitoring system. For example, the energy harvester 114 can eliminate the cost and maintenance needs of electrical wiring, and wireless communication technology (e.g., via transmitter 116) can eliminate the cost and maintenance of data communication wiring.

In some aspects, a communication network communicatively connects each seatbelt-compliance system to a networked computer. By way of example, the communication network may comprise a wireless network, such as wireless local area network (WLAN) in the aircraft's passenger cabin. Thus, the transmitter 116 may be a WLAN transmitter, such as a WiFi transmitter, or may employ other suitable wireless technology. Examples of wireless technologies that may be employed include machine-type communications (MTC), Internet-of-Things (IoT) communications, wireless sensor network (WSN) communications, or ultra-reliable low-latency communications (URLLC). In some aspects, the transmitter 116 employs different physical resources than a WLAN employed in the cabin for other wireless services. In other aspects, the transmitter 116 employs a WLAN used for other wireless services, such as passenger WiFi services, but may employ separate resources, virtual circuits, or virtual private network (VPN) technology.

The transmitter 116 may comprise a transceiver, wherein the receiver functionality enables block 116 to receive data, such as control information, from another device in the network. Such control information may set an internal state in the detection circuitry 111, poll the detection circuitry 111, or control other functions and/or other components in the seatbelt compliance system. The detection circuitry 111 may cause the transmission of occupancy and/or seatbelt status data upon receiving a polling signal, upon a change in state based on signals from the seatbelt detector 112 and/or the occupancy detector 113, and/or periodically.

Other devices in the network may include a central server and/or one or more mobile computing devices, referred to herein as personal digital assistants (PDAs). The PDAs may include any type of mobile computing device, including (but not limited to) smartphones, tablets, laptop computers, wearable computing devices, routers, and data aggregation points (DAPs). The network may comprise various network components implemented in hardware and/or software, such as routers, gateways, relays, repeaters, switches, cloud computing systems, fog computing systems, virtual machines, and software-defined networks.

A power source for the seatbelt compliance system may comprise an independent power supply, or may be electrically coupled to the airplane's main electric power system that provides power for seat overhead lights and seatback video displays. Energy storage 115 may comprise a battery, a capacitor, or some other energy storage device. If batteries are used as the power supply, they may be recharged from the airplane's main electric power system. In some aspects, the seatbelt compliance system receives power from an energy harvesting system 114 that converts ambient energy present in the environment to electrical energy. For example, the energy harvesting system 114 could harvest energy from the release of spring-tension when a spring-loaded buckle snaps closed, from a passenger's body heat, from a passenger's movements in the seat, or from other ambient sources, and possibly store harvested energy in energy storage components 115.

Figure 1B:
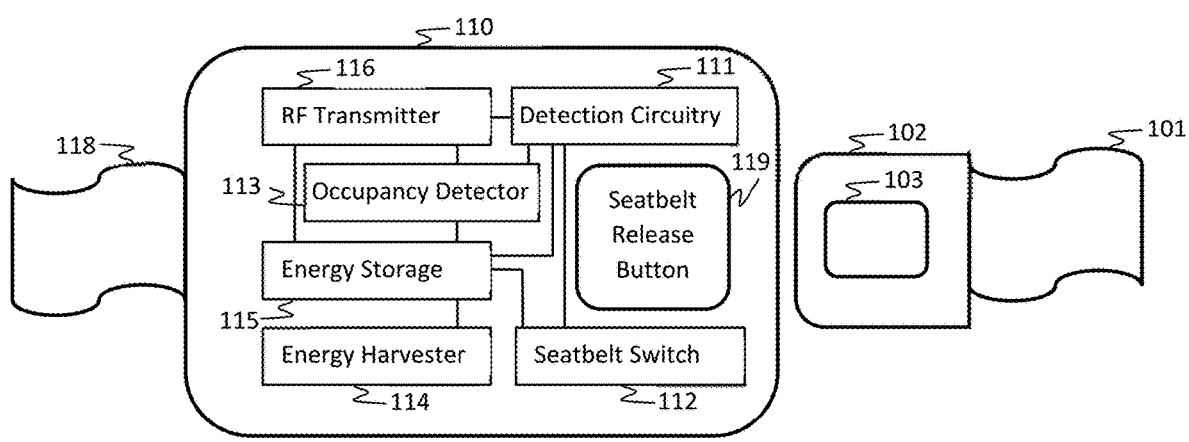
FIG. 1B depicts one aspect of a seatbelt-compliance system configured to operate inside a seatbelt buckle.

FIG. 1B depicts one aspect of a seatbelt-compliance system configured to operate inside a seatbelt buckle 110. A first strap (or webbing) 118 and a second strap (or webbing) 101 can be secured together with the buckle 110 to form a restraint. The first strap 118 may be of a fixed length and include a fixed end (not shown) anchored to a seat, floor, or the like. The buckle 110 may be affixed to a free end of the first strap 101. The second strap 101 likewise includes a fixed end (not shown) and a free end. The fixed end of the second strap 101 may be attached to a seat, floor, or the like. However, in some aspects, the fixed end of the second strap 101 may be attached to a retractor mechanism (not shown) that is mounted to the seat, floor, or some other rigid member. The second strap 101 may be longer than the first strap 118 to allow for adjustments in the length of the seatbelt. A tongue 102 may be affixed to the free end of the second strap 101. The tongue 102 can be inserted into the buckle 110 to secure the first strap 118 to the second strap 101, causing the seatbelt assembly to be in a latched state. The seatbelt assembly can remain in the latched state until a seatbelt release button 119 is pressed by a passenger that causes the buckle 110 to release the tongue 102, thereby unlatching the seatbelt assembly. Although the seatbelt assembly shown in FIG. 1B depicts a lap seatbelt, other types of seatbelts may be used, such as lap and sash belts, three-point seatbelts, five-point harnesses, or the like.

According to aspects of the disclosure, electronic and/or electro-mechanical components may be contained within the seatbelt buckle 110. For example, the buckle 110 may include detection circuitry 111 communicatively coupled to seatbelt switch 112, occupancy detector 113, and RF transmitter 116. Energy harvester 114 and energy storage 115 may be housed within the buckle 110 and provide electrical power to the circuitry 111, switch 112, detector 113, and transmitter 116.

In one aspect, the energy harvester 114 may include a piezoelectric element that converts mechanical energy into electrical energy. More specifically, the piezoelectric element can generate an electric potential in response to mechanical stress applied to the piezoelectric element, such as an insertion of the tongue 102 into the buckle 110, activation of the buckle's 110 seatbelt release button 119, tension variations in the buckle 110 due to the passenger's movement, or aircraft vibration. As such, the energy harvester 114 might be configured to perform as a sensor that indicates the state (or change of state) of seat occupancy and/or seatbelt use. In one aspect, electrical energy harvested during the insertion may provide an electrical signal to the transmitter 116 to cause the transmitter 30 to transmit a wireless signal indicating the status of the seatbelt buckle (e.g., latched or unlatched), referred to herein as a seatbelt status signal. The electrical signal produced by the energy harvester 114 in response to the seatbelt being buckled or unbuckled and/or in response to passenger movement in the seat can be used as both a data signal indicating seatbelt and/or occupancy status, and electrical energy to power the transmitter 116.

In some aspects, the seatbelt switch 112 is responsive to the tongue 102 being latched or unlatched, such as for closing or opening a circuit, indicating a latched or unlatched state, from which the seatbelt status signal may be generated. In one aspect, the seatbelt switch 112 closes a circuit, causing the energy storage 115 to charge. This may power a "heartbeat" signal to the detection circuitry, which might optionally transmit a seatbelt and/or occupancy status signal via the transmitter 116. Unlatching the seatbelt may cause the energy storage 115 to provide an electrical impulse to the detection circuitry 111 and/or transmitter 116, causing transmission of an updated seatbelt and/or occupancy status.

While the electrical functional elements contained in the buckle 110 are described herein as separate components, it should be understood that multiple electrical elements may be combined into a single component, such as an integrated circuit, microprocessor, or any type of general-purpose processor programmed to perform the disclosed functions, without departing from the scope of the present application.

Figure 2:
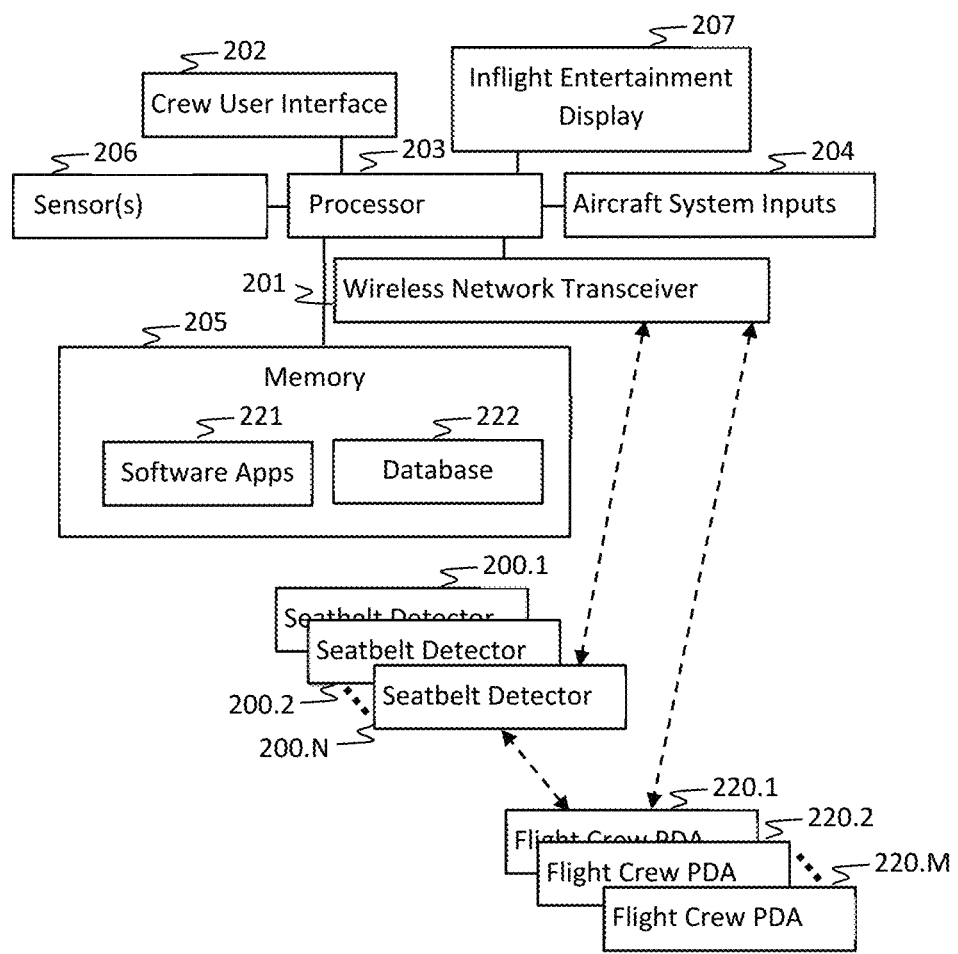
FIG. 2 illustrates a communication network configured in accordance with aspects of the disclosure.

FIG. 2 illustrates a communication network configured in accordance with aspects of the disclosure. A computing system (such as a server or a PDA) can comprise a wireless network transceiver 201, a graphical user interface (such as a crew user interface 202 and/or an IFE display 207), a processor (such as a CPU) 203, and at least one computer-readable memory 205 communicatively coupled to the CPU 203, the memory providing for data storage (e.g., database 222) and software applications (221) comprising software instructions executable by the CPU 203 to perform the methods disclosed herein. Optionally, the computing system may receive inputs from one or more environmental sensors 206, which may detect environmental conditions inside the aircraft (e.g., temperature, air pressure, humidity, chemicals) and/or operating condition sensors to detect operating conditions of the aircraft (e.g., turbulence, acceleration, yaw, pitch, roll). Optionally, the computing system may have one or more input ports 204 for receiving aircraft system information, which can comprise operating procedures of the aircraft (e.g., aircraft doors closed, push-back, taxi, take-off, cruising altitude, descent, holding pattern, final approach, landing, ramp navigation, aircraft doors open) and/or cabin operations (e.g., seatbelt sign status, flight crew announcements, cabin lighting, chimes, meal service).

Database 222 may record data inputs from aircraft system inputs 204, sensors 206, seatbelt detectors 200.1-200.N, and (optionally) PDA 220.1-220.M inputs. In some aspects, database 222 may include passenger information, such as a passenger identifier, and may further comprise a history of data associated with the passenger, such as may have been collected during previous flights. Software applications 221 may comprise predictive analyses (such as may employ an artificial neural network) that predicts passenger seatbelt compliance with respect to any number of parameters, ranging from cabin operations and aircraft operations, to flight-crew notes, and previous seatbelt compliance. Various types of artificial neural networks may be employed, such as deep learning neural networks, convolutional neural networks, recurrent neural networks, or others.

In some aspects, the computing system employs a wireless network to communicate with seatbelt-compliance systems (labeled as "seatbelt detector") 200.1-200.N and (optionally) one or more PDAs 220.1-220.M. The PDA(s) 220.1-220.M may be configured to communicate with the individual seatbelt-compliance systems 200.1-200.N. In some aspects, certain cabin operations may be automated by the computer system, possibly in response to aircraft system inputs 204 and/or sensors 206. In one example, the computer system responds to detected turbulence or flight operations to automatically light the seatbelt sign. In some aspects, the system is responsive to the seatbelt detector 112, the occupancy detector 113, and/or other passenger-specific information to communicate with the passenger and/or the flight crew. In one example, the computer system responds to a seatbelt detector 112 indication of an unlatched seatbelt by notifying the flight crew and sending a message to the passenger's smartphone or IFE device informing them to wait for a flight crew member to assist them. The message may be personalized for the particular passenger, possibly based on the passenger manifest and/or other information collected by an airline, such as via a customer rewards program.

In some aspects, the CPU 203 is a central server that uses the wireless network to poll the seatbelt detectors 200.1-200.N, compiles a summary of the seatbelt-fastened status, compares it with the current cabin seatbelt instruction sign, and records the summary on a timeline that begins when the flight leaves the departure gate and ends when it stops at the arrival gate. An application (e.g., one of the software applications 221) running on a computer, smartphone, or tablet may display the current summary of seatbelt-fastened status, such as indicated by user interface displays in FIGS. 3A and 3B.

In one aspect, as shown in FIG. 2, information collection from the seatbelt detectors 200.1-200.N is provisioned via CPU 203 using a software application 221, which stores the information in the database 222 in memory 205. The data collection may be periodic and/or event driven. The database 222 may store the seatbelt-compliance data with an associated timestamp. Database 222 may further store data from sensors 206, data input from flight-crew PDAs 220.1-220.M, and/or aircraft system inputs 204 with an associated timestamp. Timestamps may be used as indices to associated seatbelt-compliance data with certain events. The software 221 may query the database 222 to generate various reports, warnings, and/or safety compliance instructions to display on the crew user interface 202 and/or transmit to the PDAs 220.1-220.M. In some aspects, the IFE display 207 may be configured (such as via software 221) to communicate messages to the passenger. In some aspects, reports comprising time-based records may be generated and indexed by passenger and/or particular events. These reports may be used to improve cabin operations and customer service.

In one aspect, disclosed methods and systems may adapt cabin operations policy based on the time-based record. Cabin operations policy may include setting cabin temperature, cabin lighting, illumination of seatbelt signs, scheduling of meal and/or drink service, timing of inflight announcements over the cabin's public address system, providing availability of in-flight entertainment and/or other services, as well as other operations. The cabin operations policy can be adapted to enhance safety compliance. The time-based record can be analyzed to produce passenger activity patterns, such as may be inferred from seat occupancy data, seatbelt compliance data, lavatory occupancy data, IFE use, overhead light use, overhead air vent setting, seatback incline, and/or other inflight information. Cabin operations may be scheduled based, at least in part, on passenger activity patterns determined from the time-based records. Information of varying granularity, ranging from personal data or activity pattern history for each passenger, to flight duration can be used along with the time-based records to schedule cabin operations or adapt other policy.

Figure 4A:
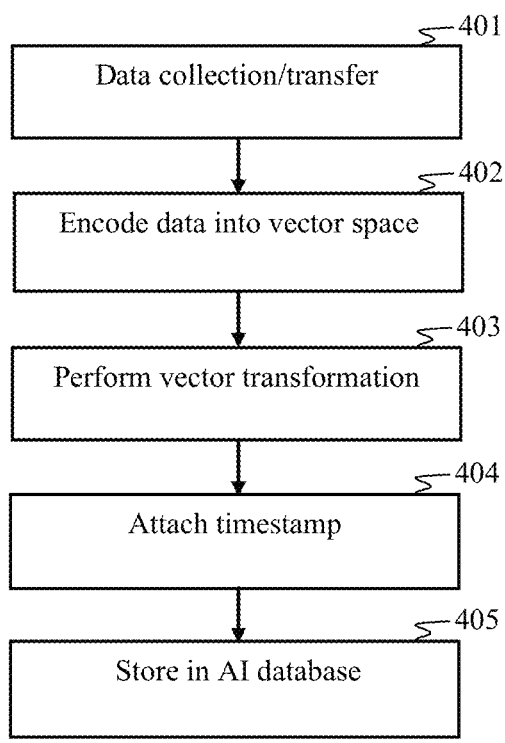
FIG. 4A illustrates Artificial Intelligence data processing method and apparatus aspects of the disclosure.

FIG. 4A illustrates AI data prep method and system aspects of the disclosure. Some aspects can provide for transferring 401 data generated within a specified time period from the database 222, processing the data via various operations 402, 403, and 404, and then storing 405 the data to an AI database. The data may include seatbelt-compliance data, seat occupancy data, aircraft system data, and sensor data recorded within a set time period. The transfer may take place on a regular basis, such as via a cron job or similar time-based scheduled transfer process.

The computer system may collect real-time data to be processed for the AI database and/or may transfer data from the database 222. In some aspects, the data in database 222 is in a raw (original), unprocessed format. In some aspects, the computer system adds the new data to each passenger record and places the data in the correct index position based on the timestamp attached to the data. The result is a time series record of data generated by the seatbelt detectors 200.1-200.N, which can be stored in the AI database for real-time or future use. The system may employ an encoding process 402 to transform the imported data into a vector space, which is a mathematical representation of information through the use of vectors, that allows the use of vector mathematics to process, express, and display related information, such as aircraft operations, cabin operations, and so forth. Any of various types of encoding may be used to transform 403 the data into an encoded sparse vector. At the same time, encoding process 402 can transform text found in the data (for example, flight-crew notes) into a dense vector representation, by use of dense word vector encoding techniques, such as word2vec or GloVe. These dense word vector encoding models are in certain circumstances pre-trained with outside data or trained using internally generated data, or a combination of both. Next, the vector transformation process 403 concatenates all of the sparse and dense vectors generated into a single ordered, long sparse vector. The transformation 403 process ensures that the order of the data appearing in the concatenated vector is the same. The system replaces any missing data or empty vector with an empty vector of the same size as the vector that would be generated for that category. The end result is a very long, mostly sparse vector that contains all the information generated for each flight and/or for each passenger, for example.

The vector transformation 403 may transform the ordered long, sparse vector into a dense vector through the use of an autoencoder. The autoencoder 403 learns a representation (encoding) for a set of data, typically for the purpose of dimensionality reduction. Each flight's (or passenger's) long, sparse vector is thus transformed into a dense vector that is more useful for certain AI processes. A database management system then attaches 404 the appropriate timestamp(s) to the dense vector and stores 405 the vector in the AI database. The vector, which represents new data generated for a passenger or flight, is added to the record and placed in the correct index position based on the timestamp attached to the vector. The result is a time series of dense vector-space representations of all selected data generated by the system depicted in FIG. 2 and stored 405 in the AI Database for real-time and/or future use.

The AI database contains a record for each flight based on data generated from the seatbelt detectors 200.1-200.N, and possibly from aircraft system inputs 204, sensor inputs 206, PDA 220.1-220.M inputs, and/or external data (such as passenger information, manifests, and the like). The AI database may store records for each passenger over multiple flights. Each record includes a time series of all the information gathered over time, providing a rich record of data that can be used for improving cabin operations and customer service, and predicting compliance with cabin operations. Data can be collected from other sources, including (but not limited to) other aircraft, air traffic control, weather services, social media, IFE services, etc. The data may be stored in the AI database as raw, original data and as vector-space representations of the data. All data can be associated with a timestamp, incremental timestep, or other time sorting mechanisms. Additionally, each record could possibly be associated with a cohort (a group of records that share common characteristics within a defined time-span).

Figure 4B:
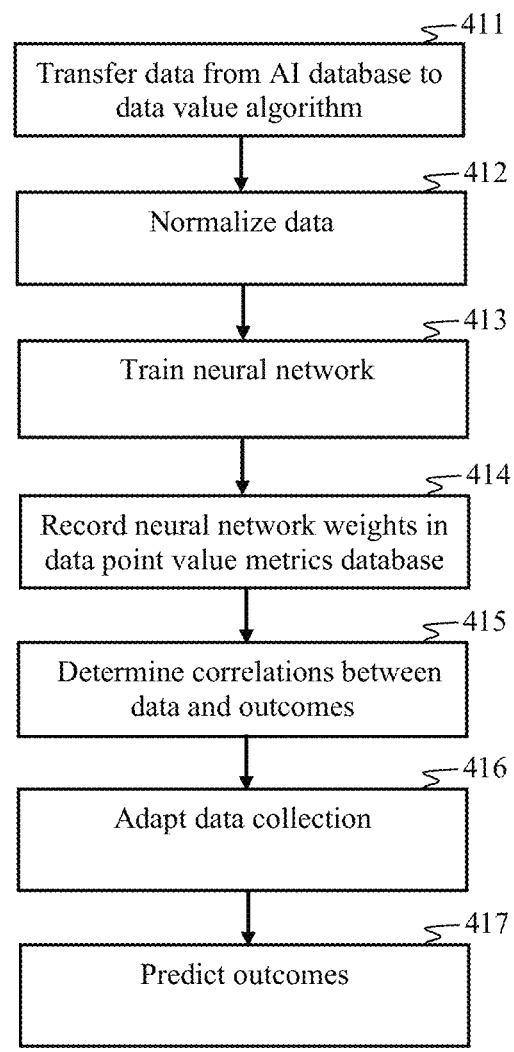
FIG. 4B illustrates data value algorithm system and method aspects.

A data value algorithm system and method can use a deep learning neural network to determine which data points are most valuable in predicting seatbelt compliance issues. In one aspect illustrated in FIG. 4B, the raw data and vector representations are accessed 411 from the AI database by the data value algorithm. A normalization process 412 can normalize the data by mapping all numeric values to a similar number scale (e.g. 0 to 1), allowing for later cross-category comparisons. In one aspect, for example, occupancy detector 113 can detect (amount and type of) passenger movement, and this data along with seatbelt compliance and other data can be stored in the AI database. Seatbelt compliance data can be regarded as outcome data for the purposes of discovering trends in other data that lead to seatbelt compliance or non-compliance, and/or predicting such outcomes. In some aspects, outcome data may comprise a passenger comfort index, as may be determined from the occupancy detection sensor data, and which may be particular to each passenger, which the data value algorithm can learn. The system uses the normalized data and outcomes to train and retrain 413 a neural network. The neural network may be a multivariate deep learning neural network trained on all passenger data with a goal of minimizing the summed error of predicting specific outcomes of cabin operation policies, seatbelt compliance or passenger comfort, for example. Other types of neural networks, such as a convolutional neural network or a long short-term memory network, can also be used. Once the system has trained 413 the neural network, a data recording process captures the associated weights for each data category from the final state of the trained neural network and records 414 these associated weights in a data point value metrics database. The learned weights of the neural network can be used to estimate the importance of each category with respect to outcomes 415. Disclosed aspects can employ any combination of supervised and unsupervised learning. The system, including the neural network, may be used to adapt cabin operating procedures to ensure that flight crews to ensure the safety and comfort of passengers.

One aspect employs weighted algorithms and neural networks trained on global data (e.g., flight and/or passenger histories), in conjunction with a policy network that may train on local data (e.g., a current flight) and determine 416 which data should be collected and how often in order to optimize the value of the data being gathered. The algorithm may access each passenger's flight records from the AI database, and may access flight data from previous flights that correlate with the current flight (such as route, flight duration, time of day, time of year, weather conditions, number of passengers, etc.). Thus, the system receives a table or record that documents seatbelt compliance and/or comfort index for each individual passenger relative to a set of correlated data points, and the system receives a record of seatbelt compliance and/or comfort index that represents all passengers on previous flights that the system considers to be relevant. The system then passes this data to the weighted algorithm, which determines relevance between the data sets in order to predict outcomes 417, which may be particular to each passenger or general to all passengers on the flight. In this manner, the weighted algorithm can inform the flight crew of anticipated compliance and passenger needs, and/or recommend cabin operations that will improve compliance and/or comfort.

In one aspect, the system learns from training data (which can be via supervised or unsupervised learning) how to adapt cabin operations to improve safety compliance. The training data can comprise a time-based record of safety compliance data, together with cabin operations data, such as cabin temperature, cabin lighting, illumination of seatbelt signs, meal or drink service, inflight announcements over the cabin's public address system, the availability of in-flight entertainment, etc. In addition to determining a cabin operations policy from the training set, the system can be configured to dynamically adapt the policy in response to aircraft operations, environmental conditions, flight time, passenger information, and/or possibly other factors. The trained neural network can then input any of the aforementioned information and schedule cabin operations therefrom. The cabin operations can include cabin temperature, cabin lighting, illumination of seatbelt signs, timing of meal or drink service, timing of inflight announcements, timing the availability of in-flight entertainment, and/or other operations.

The weighted algorithm can be created manually, and/or can be designed using statistical methods such as regression. The weighted algorithm may be periodically modified to improve performance. Other types of formulas to maximize the value of the data gathering process and other types of neural networks, such as a convolutional neural network or a long short-term memory network, can be employed.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. An apparatus, comprising:
    a seatbelt detection system that detects seatbelt use in each seat of a passenger aircraft; and
    a computer system communicatively coupled to the seatbelt detection system and configured to:
        receive data from a plurality of sensors in an aircraft cabin; and
        employ an artificial intelligence (AI) program to train on data comprising at least one of safety compliance data, aircraft system data, cabin environment data, cabin operations data, or aircraft operations data; the AI program being configured for minimizing a summed error of predictions of seatbelt compliance.

2. The apparatus of claim 1, wherein the computer system comprises at least one of an aircraft system input port to receive the aircraft system information, an interface to an environmental sensor to receive the cabin environment data, or an interface to an aircraft operating condition sensor to receive the aircraft operations data.

3. The apparatus of claim 1, wherein the computer system is programmed to use a time-based record of the safety compliance data to adapt cabin operations policy.

4. The apparatus of claim 1, wherein the computer system comprises at least one of a central processor, a server, or a mobile computing device.

5. The apparatus of claim 1, wherein the computer system is communicatively coupled to the seatbelt detection system via a wireless network.

6. The apparatus of claim 1, wherein the aircraft operations data comprises at least one of turbulence, acceleration, yaw, pitch, or roll.

7. The apparatus of claim 1, wherein the computer system includes at least one of aircraft system data, cabin environment data, cabin operations data, or aircraft operations data in a time-based record.

8. The apparatus of claim 1, wherein the computer system includes a user interface to display at least one of real-time seatbelt use information or a time-based record of seatbelt use.

9. An apparatus, comprising:
    at least one processor; and
    at least one memory in electronic communication with the at least one processor, and instructions stored in the at least one memory, the instructions executable by the at least one processor to:
    receive safety compliance data from a plurality of sensors in an aircraft cabin; and
    employ an artificial intelligence (AI) program to train on data comprising at least one of safety compliance data, aircraft system data, cabin environment data, cabin operations data, or aircraft operations data; the AI program being configured for minimizing a summed error of predictions of seatbelt compliance.

10. The apparatus of claim 9, further comprising at least one of an aircraft system input port to receive the aircraft system information, an interface to an environmental sensor to receive the cabin environment data, or an interface to an aircraft operating condition sensor to receive the aircraft operations data.

11. The apparatus of claim 9, wherein the computer system is programmed to use a time-based record of the safety compliance data to adapt cabin operations policy.

12. The apparatus of claim 9, wherein the safety compliance data comprises at least one of seatbelt use, seatback incline, tray table position, and seat occupancy.

13. The apparatus of claim 9, wherein the aircraft operations data comprises at least one of turbulence, acceleration, yaw, pitch, or roll.

14. The apparatus of claim 9, wherein the at least one memory comprises instructions executable by the at least one processor to include at least one of aircraft system data, cabin environment data, cabin operations data, or aircraft operations data in a time-based record.

15. The apparatus of claim 14, wherein the computer system includes a user interface to display at least one of real-time safety-compliance data or a time-based record of seatbelt use.

16. A method performed by a computer system communicatively coupled to a seatbelt detection system, comprising:
    receiving safety compliance data from a plurality of sensors in an aircraft cabin; and
    employ an artificial intelligence (AI) program to train on data comprising at least one of safety compliance data, aircraft system data, cabin environment data, cabin operations data, or aircraft operations data; the AI program being configured for minimizing a summed error of predictions of seatbelt compliance.

17. The method of claim 16, further comprising using a time-based record of the safety compliance data to adapt cabin operations policy.

18. The method of claim 17, further comprising displaying the time-based record on a user interface.

19. The method of claim 16, wherein the safety compliance data comprises at least one of seatbelt use, seatback incline, tray table position, and seat occupancy.

20. The method of claim 16, wherein the aircraft operations data comprises at least one of turbulence, acceleration, yaw, pitch, or roll.

* * * * *